Oct. 8, 1963
L. C. EDGAR 3,106,677
APPARATUS FOR ELECTRICALLY DETECTING DISCONTINUITIES
IN ELECTRICALLY NON-CONDUCTIVE COATINGS ON
ELECTRICALLY CONDUCTIVE MATERIALS
Filed July 21, 1960 7 Sheets-Sheet 1
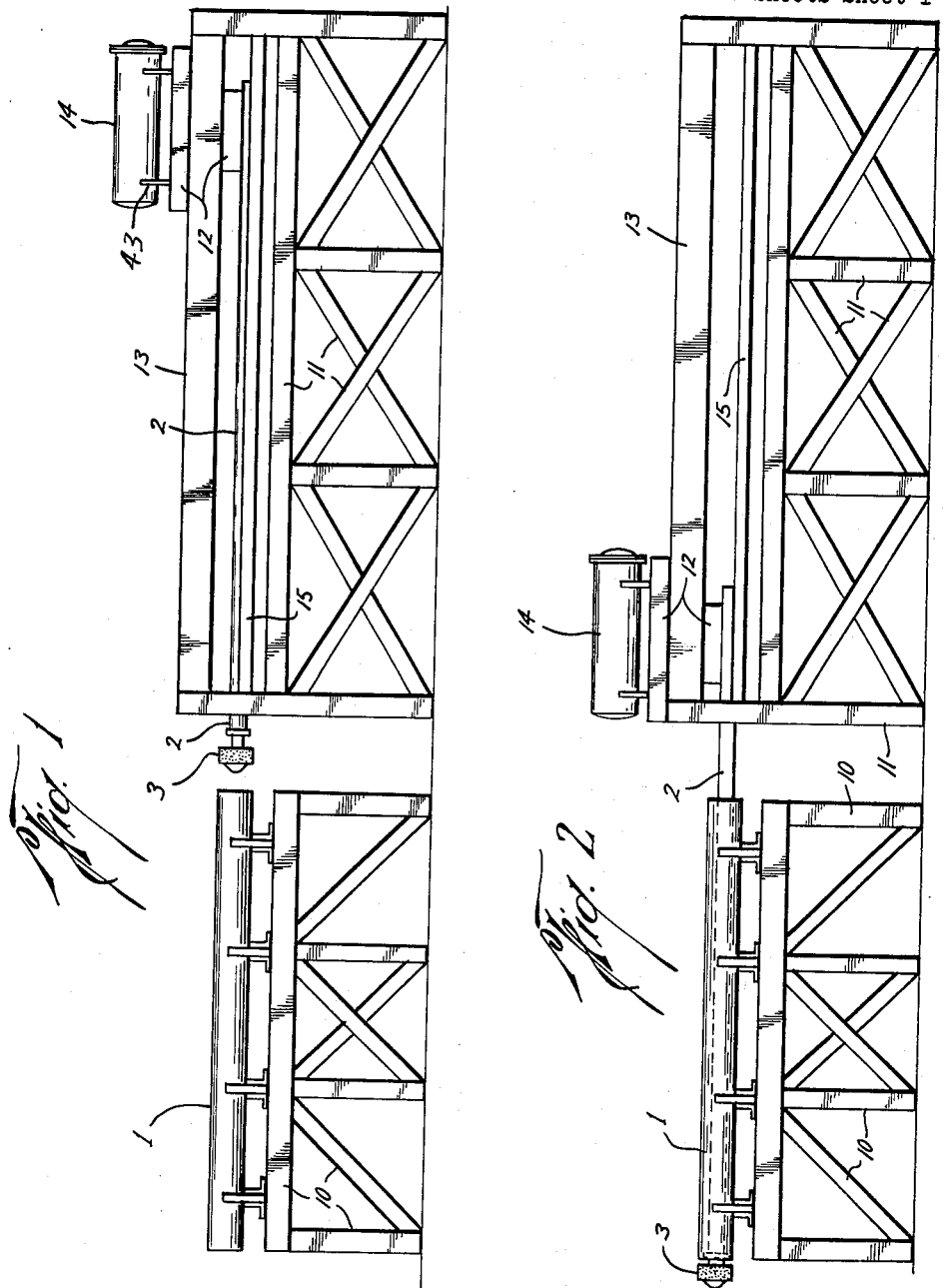
Lenville C. Edgar
INVENTOR.
BY O C Roylance
Tom Arnold
ATTORNEY

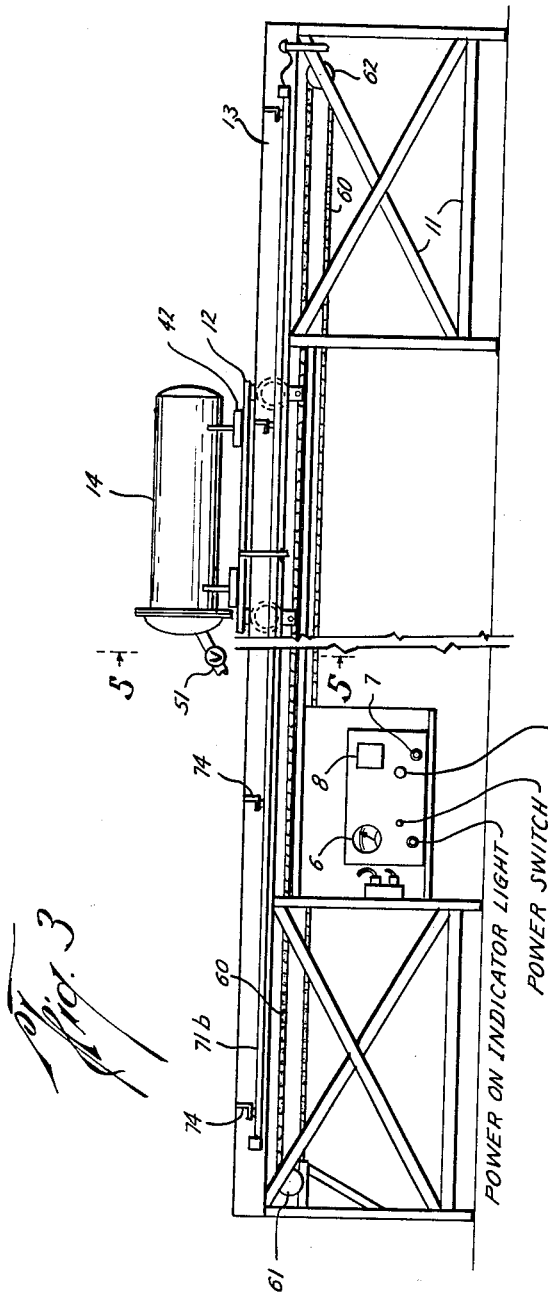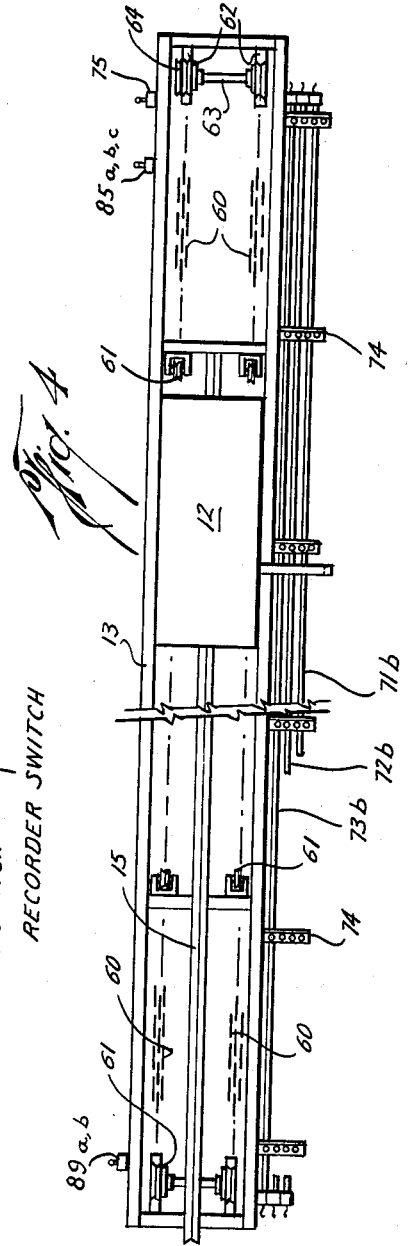

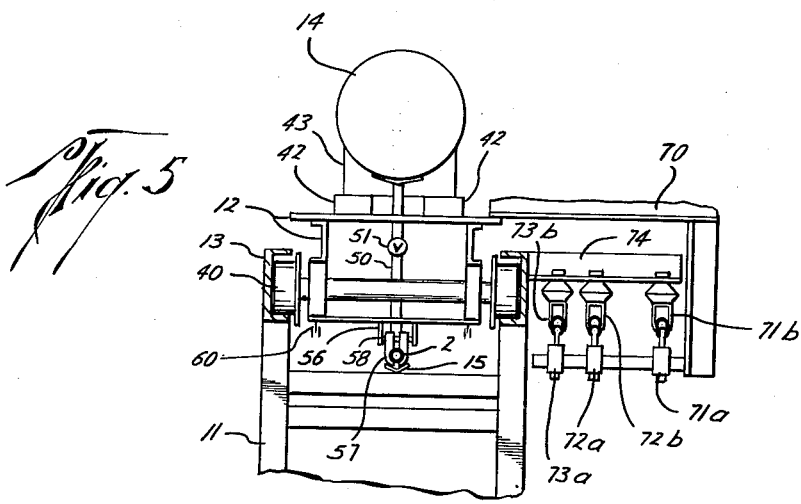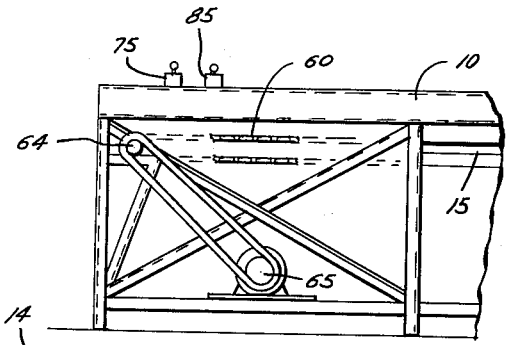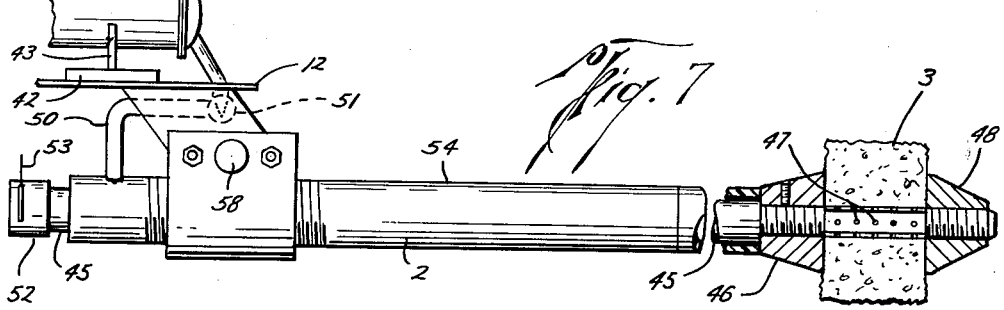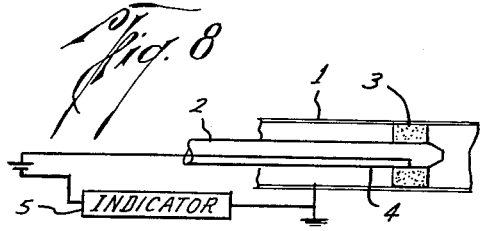

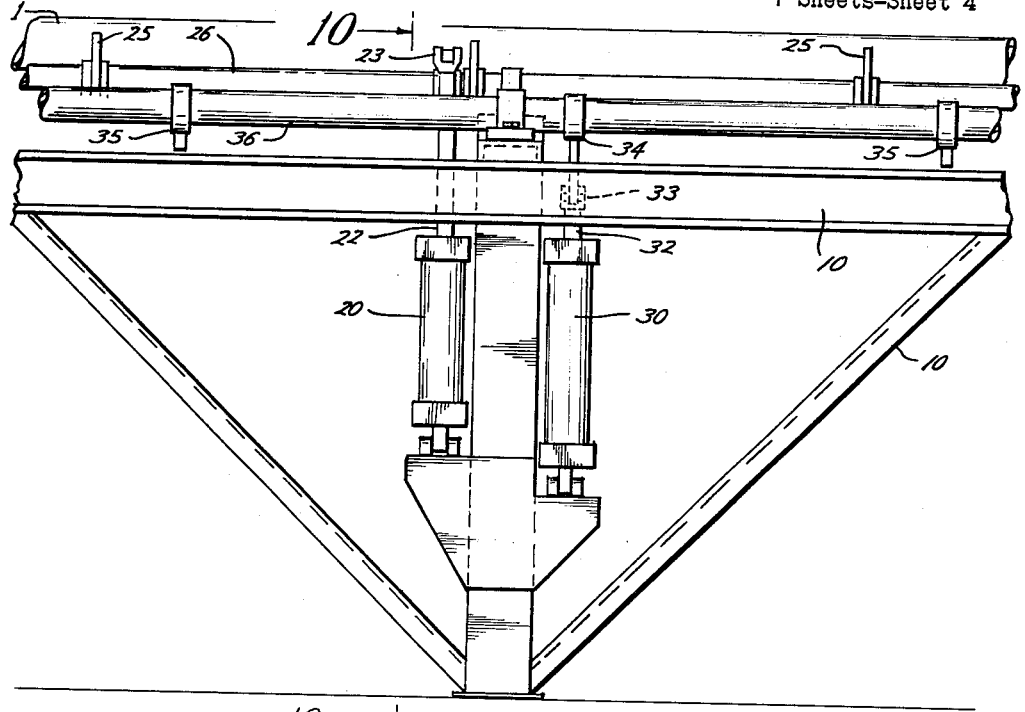
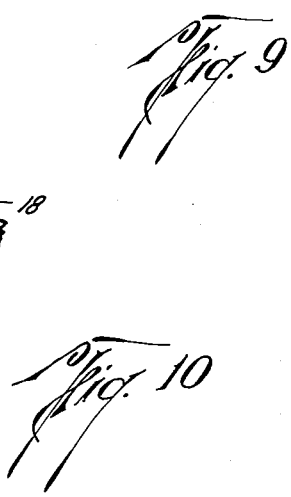
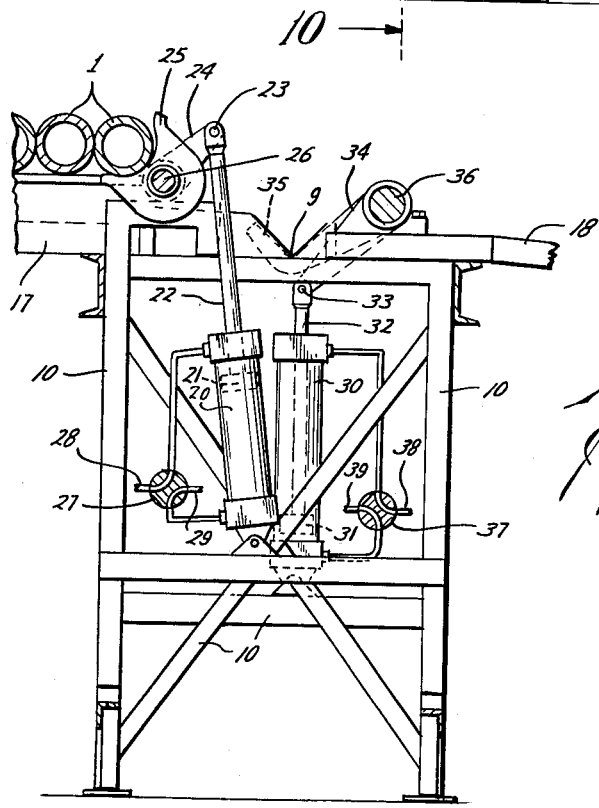
Fig. 9
Fig. 10
Lenville C. Edgar
INVENTOR.
BY D.C. Roylance
Tom Arnold
ATTORNEY

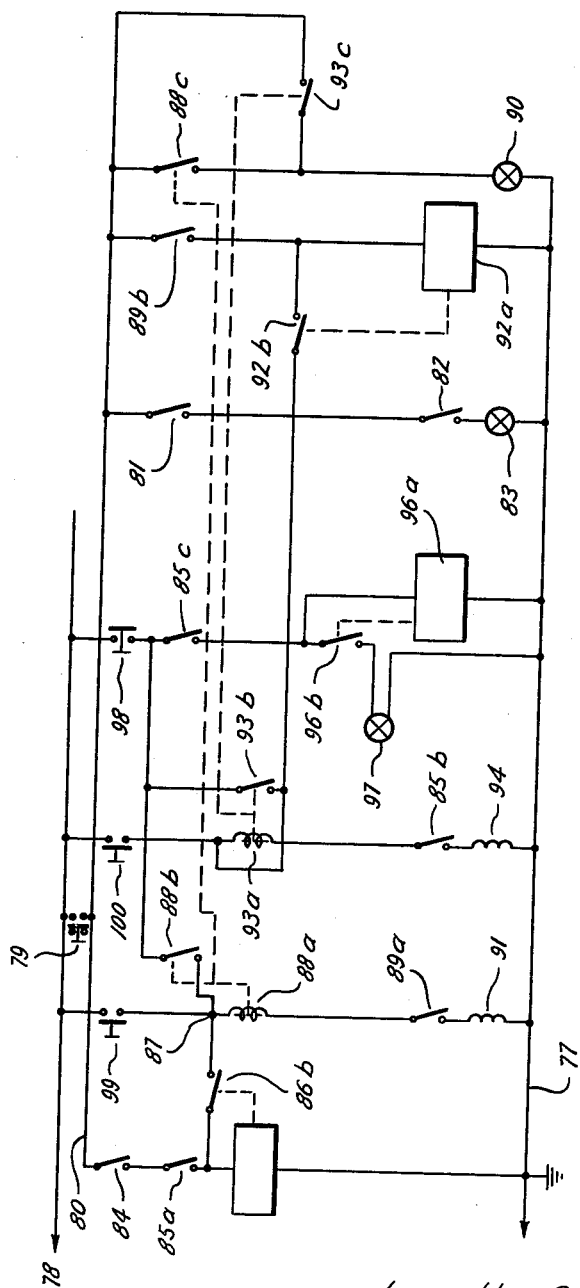

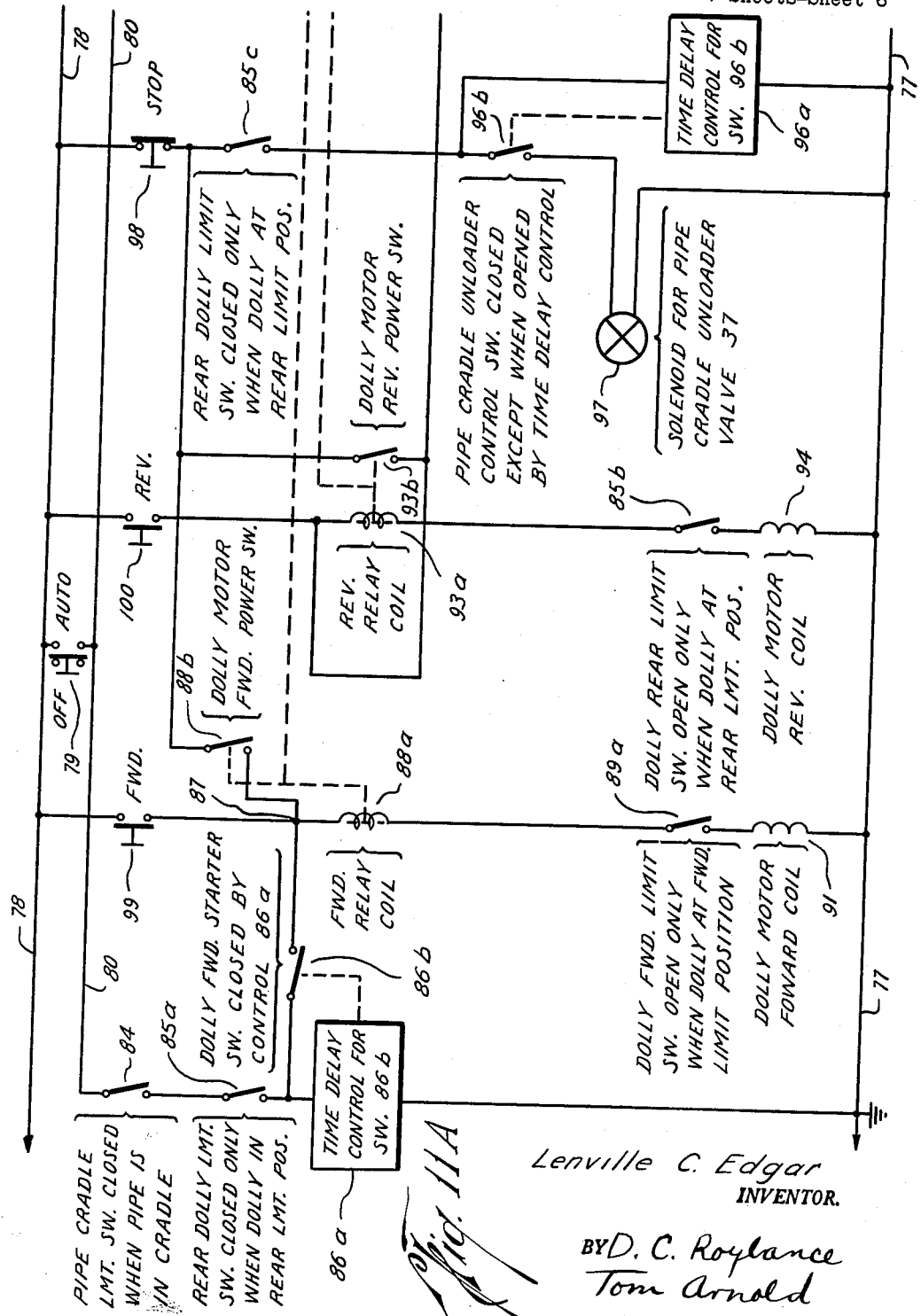

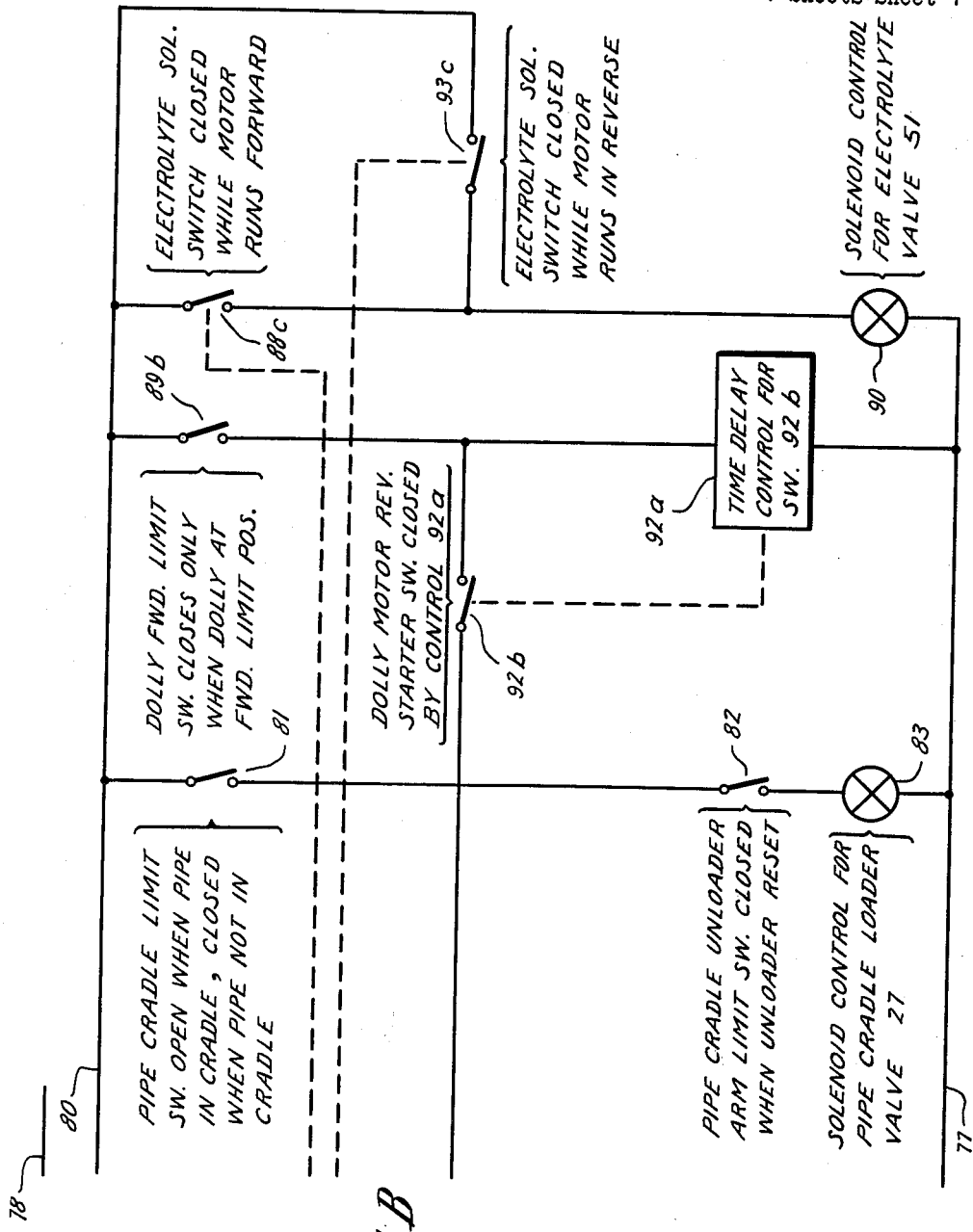

United States Patent Office 3,106,677
Patented Oct. 8, 1963

3,106,677
APPARATUS FOR ELECTRICALLY DETECTING DISCONTINUITIES IN ELECTRICALLY NON-CONDUCTIVE COATINGS ON ELECTRICALLY CONDUCTIVE MATERIALS
Lenville C. Edgar, Houston, Tex., assignor, by mesne assignments, to Tube-Kote Company, a division of Tuboscope Company, Houston, Tex., a corporation of Delaware
Filed July 21, 1960, Ser. No. 44,502
4 Claims. (Cl. 324—54)

This invention relates to coated pipe inspection equipment, and more particularly to automatic detectors of holidays (discontinuities) in nonconductive coatings inside pipe of electrically conductive material.

The plastic coating of the internal surfaces of pipe is now quite common in many industries, particularly in oil and gas production wherein the production "tubing" (which may be two inch diameter pipe or larger and hence is not to be thought of as small merely because it is called "tubing") is coated with insulating plastic on the inside before installation in a well. The purpose of the plastic is to inhibit or prevent corrosion. Its effectiveness as a corrosion preventative depends, among other things, upon whether there be any holes or "holidays" in the coating, small bubble holes or the like where bare metal is exposed and at which corrosion of electrolytical or other form may commence to eat out behind the plastic coating and eat holes in the pipe or otherwise reduce its strength and serviceability.

An object of this invention is to provide completely automatic instrumentation for inspecting pipe, which has been internally coated, for any holes or other defects in the coating.

A further object of this invention is to provide such equipment which operates rapidly, and efficiently, and which is capable of semi-automatic or "manual" operation when desired, as well as fully automatic operation.

Other objects are apparent from the following description and accompanying drawings of an example of one embodiment of the invention.

The various objects of the invention are accomplished by providing as a single integrated apparatus, pipe handling means and means for scanning the interior thereof with a scanning member which constitutes a part, along with the pipe, of an indicator circuit, all as more fully described hereinafter.

In the accompanying drawings, one exemplary embodiment of the invention is disclosed in detail.

FIGURE 1 is a schematic side elevational view of apparatus embodying this invention, with the dolly (or carriage) and lance in the extreme retracted or rearward position.

FIGURE 2 is a substantial duplicate of FIGURE 1, but this time illustrating the dolly and lance in the extreme advanced or forward position.

FIGURE 3 is a side elevational view, in a bit more detail than FIGURES 1 and 2, of the dolly and lance support and guide apparatus.

FIGURE 4 is a plan view of the dolly and lance support apparatus of FIGURE 3.

FIGURE 5 is a schematic elevational section taken along the line 5—5 of FIGURE 3, illustrating the dolly and lance equipment.

FIGURE 6 is a close-up side elevational view of the rear end of the dolly support structure taken from behind the equipment as viewed in FIG. 1, illustrating the dolly drive motor and certain switch mounting.

FIGURE 7 is a schematic large scale detail of the lance member, schematically illustrating also, in a reduced scale, the connections between lance and electrolyte tank and dolly.

FIGURE 8 is a schematic diagram of the electric alarm, or holiday indicator circuit.

FIGURE 9 is a close-up side elevational view of the pipe handling apparatus viewed at the left of FIGURES 1 and 2.

FIGURE 10 is an elevational section taken along the line 10—10 in FIGURE 9.

FIGURE 11 is a schematic electric diagram of the power circuitry that runs the machine through its various maneuvers. FIGURES 11A and 11B are enlargements of FIGURE 11, with some legends added which explain the circuit and render it more easily understood.

*Holiday Indicator Circuit*

The operating concept of a preferred embodiment of the holiday detection is perhaps best understood by referring first to FIGURE 8. There is there illustrated pipe 1, into which is inserted a lance 2 carrying on the end thereof a preferably porous and wettable pipe contact scanning member, such as a sponge 3, adapted to wipe and scan all portions of the internal surface of the pipe 1 as the lance is moved axially with respect to the pipe 1.

In the preferred embodiment of this invention, the exterior of the lance 2 itself is electrically a non-conductor, but carries therein a liquid electrolyte 4 so as to keep the sponge 3 wet with electrolyte. An electric potential is applied across the electrolyte 4 and pipe 1, which may be grounded as illustrated in FIGURE 8, and an alarm or other indicator 5 is placed in the circuit to indicate the passage of current through the circuit.

The lance 2 with sponge or other scanning contact member 3 is moved relative to the pipe 1, and when the sponge 3 encounters a "holiday," i.e., a hole in the insulating plastic coating on the inside of the pipe, the circuit is completed and current flows in the circuit including the indicator or alarm 5.

In FIGURE 3, a preferred indicator panel is shown in some degree of detail, having an ammeter indicator 6, a red light indicator 7 that lights up when the indicator circuit carries current, and also a strip-chart-with-pen-scriber indicator 8 to make a permanent record of each length of pipe. The strip chart has a line substantially straight scribed thereon as the paper passes beneath the pen in correlation with sponge scanning pipe interior and no current flows in the indicator circuit so long as the plastic coating is sound; but the pen scribes a "blip" or "pip" when the sponge 3, in its movement down a length of pipe, encounters a hole in the pipe's plastic coating through which hole the inspecting current flows to complete the indicator circuit.

Conveniently, the strip chart may be driven in direct correlation with the sponge 3 scanning of the pipe 1, to the end that the location of any defects is indicated on the tape by blips in one direction, and the pen may be arranged to move in the other direction from the normal zero current line whenever the carriage or dolly motor cuts off so as to bear also an indication of the end of each pass through each joint of pipe which indication is distinguishable from defect indications.

Purely manual scanning and inspection of pipe by the method above indicated is tedious and expensive procedure and cannot produce the permanent record often desired. Hence in accordance with this invention the basic operating concepts and apparatus are embodied in the further equipment illustrated which effects automatic scanning and inspection of one length of pipe after another.

In FIGURES 1 and 2 there is first seen a length of pipe 1 residing in a cradle at the top of a pipe support structure 10. The cradle 9 itself is best seen in FIGURE 10 as a V in one of the cross members, which opens upward to receive and position lengths of pipe, there being similar upwardly opening V's in other cross members along the length of the pipe support structure 10 as viewed in FIGURES 1 and 2.

In FIGURES 1 and 2 there is also seen the sponge 3 on the end of the lance 2 supported by a dolly or carriage support structure 11. The chassis of a dolly or carriage 12 is also schematically indicated in FIGURES 1 and 2 divided as seen in those views by horizontally running channel rails 13 which support the dolly as hereafter explained. The dolly 12 may carry an electrolyte tank 14 thereupon as illustrated, and is secured to the lance 2 for movement therewith. The lance 2 is supported when not in pipe 1, by a V angle seen at 15 in FIGURES 1 and 2.

The extreme rear or retracted position of the dolly and lance are illustrated in FIGURE 1, as they are at the commencement of any inspection. During an inspection the dolly and lance move leftward, the sponge 3 and lance 2 passing into and through the pipe 1, to the extreme forward or advance position of FIGURE 2, following which the dolly and lance are again retracted backward to the position of FIGURE 1, and a new length of pipe is placed in the cradle 9 (FIGURE 10) for inspection.

In the embodiment illustrated, the bearing members on the dolly or carriage 12, are wheels 40, and the ways in which they move are the channel bars referred to above as rails 13. Slide as well as rolling bearing means may be used as well as the preferred wheels 40, and any path for such bearing means, whether wheels or otherwise, may be considered as "ways" for such means whether they be called rails or channels or something else. A monorail, or "monoway" may be used in lieu of the disclosed two-way structure disclosed if desired; but even with so-called monorail systems, two segments of ways are usually preferred for adequate stability.

Pipe Handling

It is convenient here to note a preferred mechanism for handling the pipe 1, so that successive lengths of pipe are moved into the cradle 9 for inspection, thence removed from the cradle and replaced by successive lengths, all in due order and correlation with the operation of the lance and carriage.

The pipe support structure 10 of the invention is adapted to have pipe support racks 17 extend leftward as viewed in FIGURE 10, on a slight incline so that pipe placed upon such racks 17 tends to roll toward the pipe support structure 10 whenever permitted. Similar pipe support racks 18 extend laterally to the right as viewed in FIGURE 10 of the cradle and pipe support structure 10, also slightly inclined, but this time downward so that pipe deposited on the portion of such racks 18 illustrated tends to roll away from the equipment.

Mechanism is provided for loading pipe from the racks 17 into the cradle 9. Conveniently this pipe loading means may take the form of a pneumatic or hydraulic cylinder (applicant uses pneumatic) linkage. The embodiment of FIGURE 10 comprises a cylinder 20 pivotally mounted at one end thereof to the structure 10, and having movable therein a piston 21 mounted upon a piston rod 22, which piston rod 22 is pivotally secured at piston rod 22 is pivotally secured at hinge 23 to an arm 24 and thereby to U brackets 25, arm 24 and U brackets 25 being rigidly secured one to the other through an axle 26 rotatably carried by the structure 10.

When fluid under pressure is admitted above the piston 21 it and rod 22 move downward, rotating the U bracket 25 clockwise to lift a piece of pipe 1 slightly and deposit it in the cradle 9, and when fluid under pressure is admitted below the piston 21 the loading U bracket 25 resets to the position illustrated in FIGURE 10.

The fluid for the cylinder 20 is controlled by a two-way valve 27 adapted to connect fluid pressure line 28 and fluid exhaust line 29, selectively, to the top or bottom of the cylinder 20. As illustrated the pressure is connected to the top of the cylinder 20, but a 90° rotation of the valve and the exhaust is connected to the top of the cylinder 20 and pressure is applied below the piston 21. The position of such valve 27 is controlled by a solenoid 83 (FIG. 11) in combination with spring loading to the reset position. The valve 27 is normally in the reset position illustrated in FIGURE 10, and on occasion the solenoid 83 turns the valve 27 to the position effecting pipe loading.

Pipe is unloaded from the cradle 9 in similar manner by similar mechanism. Pipe unloading means may comprise a cylinder 30 which houses a piston 31, mounted on a piston rod 32, hingedly secured at hinge 33 to actuate an arm 34 and unload brackets 35, the arm 34 and unload brackets 35 being rigidly secured one to another through an axle 36 rotatably carried by the structure 10. A two-way valve 37, spring loaded to the reset position, selectively connects fluid pressure line 38 and fluid exhaust line 39 to either the top or bottom of the cylinder 30, pressure being admitted above piston 31 for resetting and below piston 31 for unloading. The two-way valve 37 is conveniently controlled by a solenoid 97 (FIGURE 11) as is later explained.

A pair of limit switches 81 and 84 shown only in FIGURES 11, 11A and 11B are positioned in the cradle to be responsive to the presence or absence of pipe in the cradle 9, switch 81 being open when pipe is in the cradle and switch 84 being closed when pipe is in the cradle. In addition, there is a pipe cradle unloader arm limit switch 82 positioned to be responsive to the position of the pipe unloader arm 34, switch 82 being closed when the unloader arm is reset but being open at all times when the unloader arm is operating or other than in its reset position illustrated in FIGURE 10.

Dolly (Carriage) and Appurtenances

The general support structure 11 has been previously described as carrying, among other parts, a pair of ways, i.e., channel rails 13 and a V way or support 15 for the lance 2, which are illustrated variously in an elevational section in FIGURE 5 and in side elevation in FIGURES 1, 2, and 3, and in plan in FIGURE 4.

In or on the channel ways or rails 13 run cooperating dolly bearing means, dolly wheels 40, upon which wheels 40 is mounted the dolly chassis 12. Mounted upon the dolly chassis are two insulating blocks 42 which support brackets 43 carrying electrolyte tank 14.

The preferred lance structure is most readily observed in FIGURE 7, wherein the lance is illustrated in greater detail than elsewhere. A steel or the like tube 45 is the core of the lance. On the end thereof is screwed a first brass fitting 46, to the right of which are holes 47 in the steel tube 45. Surrounding the holes 47 is the scanning contact member, such as a sponge or sponge-like member 3, permeable to electrolyte flow from the holes 47. To the right in FIGURE 7 of the holes 47 and sponge 3 there is screwed onto the tube 45 a second brass fitting 48, such that the sponge 3 is held between the first and second brass fittings 46 and 48.

The steel tube 45 traverses the length of the lance and is in fluid communication with the electrolyte tank through a flexible hose 50 of an electrical non-conductor material. In the hose 50 between the tank 14 and lance 2 is an electrolyte valve 51, which is operated by a solenoid 90 indicated in FIGURES 11 and 11B. The steel tube 45 is also in electrical communication with, and a part of, the indicator circuit schematically represented in FIGURE 8, through a brass connector 52 by which a wire 53 of the indicator circuit is secured to the steel tube 45.

Through this brass connector 52 electric connection is made to the lance and the electrolyte therein and through the electrolyte wetting the sponge the electric connection is made to the plastic interior surface of the test pipe 1. If this circuit is to avoid improper grounding, the steel tube 45 and the electrolyte and its carrier must all be insulated from ground. Hence the insulator 42 which keeps the electrolyte tank ungrounded is inserted between the tank 14 and the chassis 12. Further, the steel tube 45 is for insulation purposes surrounded with a non-conductor plastic or rubber tubing or cover 54.

If desired, the lance may be totally fabricated out of a non-conductor, provided effective electrical connection is made to the electrolyte. Or, the electrolyte can of course be conducted through conduits outside the lance though the ready availability of hollow conduit within the lance renders the use of that conduit preferable.

Means are also provided for connecting the lance 2 to the dolly chassis 12 and such means are illustrated in FIGURES 5 and 7 in front and side elevational views. A pair of protrusions 56 depend from the horizontal plate portion of the chassis 12 to the outside of the two bolted-together halves of a clamp 57 which clamps upon the lance 2, and a shaft 58 penetrates the protrusions 56 and clamp 57 to effect hinged connection between lance 2 and dolly chassis 12.

The dolly 12 is moved the length of the ways 13, as previously inferred, in the course of passing the lance 2 into a length of pipe 1. Accordingly, a pair of chains 60 are connected as seen in FIGURE 5, to the bottom of the dolly chassis 12. The chains 60 run over guide sheaves 61 the full length of the structure 11 and back again to close a complete loop as perhaps most easily visualized from a view of FIGURE 3. At the rearward end of the structure 11, there are two sprockets 62 in lieu of sheaves, the two sprockets 62 being mounted on a rotatable drive shaft 63 driven by a V-belt pulley 64. The V-belt pulley 64 is driven through a V-belt from a dolly drive motor 65. The dolly drive motor is controlled as explained below in connection with FIGURE 11, but may be run either direction to effect movement of the dolly 12 in either direction.

Alternative to a stationary motor pulling through chains the moving carriage, the carriage may itself carry a motor with a pinion adapted to engage a rack running along or constituting a rail or way but such alternative embodiment is not here illustrated.

The dolly or carriage 12 must be provided with means for making electrical connections between the solenoid 90 which actuates and controls the electrolyte valve 51, and for making the electrical connection to the brass connector 52 which is a part of the indicator or alarm circuit. Several means for making such connections are feasible, including direct connections with slack wires. In the embodiment illustrated in FIGURE 5 however, the dolly 12 carries a laterally extending arm 70 upon which ride three sliding electrical contacts 71a, 72a, and 73a. Contact 71a is connected through wire 53 and connector 52 to the lance shaft tube member 45 to energize the electrolyte, i.e., to make that portion of the indicator circuit of FIGURE 8. Contacts 72a and 73a are connected across the solenoid 90 which controls and operates electrolyte valve 51. And all three contacts 71a, 72a, and 73a are adapted to make sliding contact with three corresponding electric rails 71b, 72b and 73b best illustrated in FIGURE 4. The electric rails 71b, 72b and 73b are all mounted by angle irons 74 upon the support structure 11 and are electrically connected to complete the circuits of FIGURES 8 and 11, 11A and 11B.

The automatic operation of the apparatus also commands the use of certain limit switches positioned to be responsive to the position of the dolly as at the rearward limit and forward limit of its position. Thus there is illustrated by way of example in FIGURE 4, a double forward limit switch 89a and 89b and a triple rear limit switch 85a, 85b and 85c the electrical connections to which are apparent in FIGURE 11. And there is still further, another limit switch 75 at the rear of the structure 11 which operates to stop the tape in the tape recorder indicator, if such indicator is used, so that the tape will be running only when the dolly is running. Conveniently, this limit switch 75 may be behind the limit switch 85b which controls the dolly motor 65, so that the dolly can coast nearly to a stop before cutting off the indicator tape motor.

*Electric Power Circuit*

A preferred electric power circuit is illustrated schematically in FIGURES 11, 11A and 11B, FIGURES 11A and 11B being an enlargement of two halves of FIGURE 11 to permit addition of explanatory legends thereto. Thus in FIGURES 11, 11A and 11B there may be observed a ground line 77 and power supply line 78 connected by an off-automatic switch 79 (for automatic operation) to a power line 80.

Legends used on FIGURES 11A and 11B sufficiently explain the circuit to justify its further explanation only in the phraseology of its operation. Cross reference to the full circuit in FIGURE 11 and to FIGURES 10 and 9 may be convenient also. Assume first, the equipment at rest, with no pipe in cradle 9.

Off-automatic switch 79 may be moved to the automatic position, thus energizing the line 80. When no pipe is in the cradle, the pipe cradle limit switch 81 is closed. Beneath switch 81 we find the pipe cradle unloader arm limit switch 82 is closed for the unloader arm when we start our story is in the reset position. Beneath the switch 82, then, we find the pipe cradle loader arm solenoid 83, which controls pipe loader valve 27, is energized to move to the "load" position, actuating the piston 21 to load pipe 1 into the cradle 9. The arrival of pipe 1 in the cradle 9 opens pipe cradle limit switch 81, de-energizing solenoid 83, permitting the spring loaded valve 27 to return to reset position and thus actuate the loading arm to reset the loader.

Pipe 1 now in the cradle 9 closes pipe cradle limit switch 84, and the dolly 12 being now at rest at its rearward position, dolly rear limit switch 85a which is closed when the dolly is in the rear limit position, completes the circuit to energize time delay control 86a. Time delay 86a times out and then closes dolly forward starter switch 86b, providing power through terminal 87 to relay coil 88a. Relay coil 88a, upon being energized, closes dolly motor forward power switch 88b and closes electrolyte solenoid switch 88c which remains closed while the dolly motor runs forward, thus affording energy to electrolyte valve 51's control solenoid 90 to open electrolyte valve 51 and admit electrolyte under gravity feed to the sponge 3.

Beneath relay 88a we find dolly forward limit switch 89a closed as it always is except when the dolly is at the forward limit of its travel and so the dolly motor forward coil 91 is energized to commence to drive the dolly forward, and cause the lance 2 to enter the pipe 1 and the sponge 3 to scan the plastic coating on the pipe 1.

Upon departure of the dolly from its rearward position, tape recorder switch 75 closes to commence the tape drive and the rear dolly limit switch 85a opens, thus de-energizing time delay control 86a which in turn opens dolly forward starter switch 86b, leaving the dolly motor forward coil 91 powered only through dolly motor forward power switch 88b.

Upon the dolly reaching the forward limit of its travel, dolly forward limit switch 89a and 89b are actuated, 89a opening to de-energize the dolly forward coil 91 and 89b closing to energize time delay control 92a. While time delay control 92a times out, relay 88a has been de-energized by the opening of 89a, and spring loaded dolly motor forward power switch 88b and electrolyte solenoid 88c each snap to open position, resetting 88b and terminating the flow of electrolyte to the sponge 3.

When control 92a times out, dolly motor reverse starter switch 92b is closed to energize relay coil 93a, which in turn closes dolly motor reverse power switch 93b and electrolyte solenoid control switch 93c thus again energizing solenoid 90 and affording flow of electrolyte through the solenoid controlled valve 51 to the sponge 3.

Beneath reverse relay coil 93a we find dolly rear limit switch 85b closed for the dolly is now at the forward limit of its travel. Thus the dolly motor reverse coil 94 is energized to drive the dolly back toward its rear position. If desired, appropriate motor overload devices may be installed between the motor coils 91 and 94 and ground 77.

Upon departure of the dolly from its forward position, dolly forward limit switch 89a closes and forward limit switch 89b opens thus de-energizing time delay control 92a, opening dolly motor reverse starter switch 92b and leaving the dolly running in reverse on power received through dolly motor reverse power switch 93b.

Upon arrival of the dolly at the rear limit of its travel, tape recorder limit switch 75 opens thus stopping the running of the tape, and if desired also causing the pen to deflect in a direction opposite that for a holiday so as to indicate on the chart the end of inspection of a length of pipe. Also upon arrival of the dolly at the rear limit of its travel dolly rear limit switch 85a closes to its "set" position and dolly rear limit switch 85b opens to de-energize the dolly motor and stop dolly travel, to de-energize reverse relay coil 93a and thus open dolly motor reverse power switch 93b and electrolyte solenoid switch 93c thus in turn deenergizing solenoid 90, closing valve 51, and cutting off the flow of electrolyte to sponge 3.

Just now pipe remains in the cradle so pipe cradle limit switch 81 is open. But dolly rear limit switch 85c is closed thus energizing time delay control 96a, and also through pipe cradle unloader control switch 96b energizing solenoid 97 which upon being energized turns unloader valve 37 to "unload" position, thereby effecting unloading of the pipe just inspected from the cradle and opening pipe cradle limit switch 81. While the unloading is occurring, pipe cradle unloader arm limit switch 82 opens. Also, time delay control 96a is timing out and then opens pipe cradle unloader control switch 96b thus de-energizing unloader solenoid 97 and permitting unloader valve 37 to return to reset position and thereby return the unloader arm and brackets to reset position.

With the unloader arm in reset position, pipe cradle unloader arm limit switch 82 closes, and since pipe has now been removed from the cradle pipe cradle limit switch 81 closes to energize the solenoid 83 control for pipe cradle loader valve 27 commencing the cycle all over again.

If the operator runs out of pipe so that no new length of pipe 1 is loaded upon operation of the loader mechanism, the device stops operating for pipe cradle limit switch 84 remains open preventing the dolly motor from getting power to start. Similarly, if it is desired to stop the operation at any time, the stop button 98 may be pressed, thus cutting off power to both the forward and reverse coils 91 and 94 of the dolly motor and de-energizing as well relays 88a and 93a, thus opening switches 88c and 93c and cutting off flow of electrolyte.

If at any time it is desired to start the machine operating in the forward position, the operator may press momentarily the spring-loaded-open push-button 99, thus energizing relay 88a, closing dolly motor forward power switch 88b, then releasing the push button 99 for the apparatus is by then functioning fully. If however, the machine should not start because dolly forward limit switch 89a is being held open because the dolly is at the forward limit of its travel, then by momentarily pressing spring-loaded-open reverse push-button 100 the machine can be started in the reverse direction.

Note further, that if the off-automatic switch 79 is open, momentary pressing of the forward push-button 99 runs the device through one-half of its cycles, whereupon its stops for lack of power in line 80 to energize time delay control 92a and dolly motor reverse starter switch 92b, and thus for failure of the dolly motor to start backward on the second half of the cycle. In similar manner however, the reverse push-button 100 may be pressed to effect the reverse half cycle whereupon the device stops.

It is apparent that many modifications may be made in the invention as above particularly described without departing from the scope of the invention. For example, the pipe loading and unloading mechanisms may be made to reset by gravity instead of by air pressure. The electrolyte may be force-fed rather than gravity fed. Or a scanning member comprising a conductor disc, or a plurality of feelers may be used in lieu of the preferred electrolyte-wet contact scanning member. The electrolyte tank may be mounted other than on the carriage, and connected to the sponge, or to the lance, by a flexible hose. Accordingly, the foregoing description is to be construed as illustrative only, and not as a limitation upon the invention as defined in the following claims.

Applicant sets forth below an index of part names and reference numerals as used in this specification:

1, pipe
2, lance for insertion into pipe 1
3, contact scanning means such as sponge carried on the end of lance 2
4, liquid electrolyte carried within the lance
5, alarm or other indicator placed in circuit of FIGURE 8
6, ammeter type indicator
7, red light type indicator
8, strip chart tape recorder indicator
9, cradle at the top of pipe support structure 10
10, pipe support structure
11, dolly or carriage and lance support structure
12, chassis of dolly or carriage
13, ways or rails along which dolly 12 moves
14, electrolyte tank carried upon the dolly 12
15, V angle support for lance 2
16 (not used)
17, pipe support rack to left of pipe support structure 10 for uninspected pipe
18, pipe support rack to right of cradle 9 for pipe already inspected
19 (not used)
20, cylinder (for pipe loading) pivotally mounted at one end to the structure 10
21, piston movable within cylinder 20
22, piston rod upon which piston 21 is mounted
23, hinge at which piston rod 22 is secured to arm 24
24, arm mounted on axle 26 and hinged to piston rod 22
25, U bracket mounted on axle 26
26, axle rotatably carried by the structure 10
27, two-way fluid valve controlling pipe loader
28, pressure line to loader control valve 27
29, exhaust line from loader control valve 27
30, cylinder for pipe unloader pivotally mounted on structure 10
31, piston housed in cylinder 30
32, piston rod on which piston 31 is mounted
33, hinge where piston rod 32 is secured to arm 34
34, arm actuated by piston rod 32 and mounted on axle 36
35, unload brackets mounted on axle 36
36, axle mounted on structure 10 and carrying arm 34 and unload brackets 35
37, unloader control valve
38, pressure line to loader control valve 37
39, exhaust line from loader control valve 37
40, dolly wheels or other moving support bearing means
41, (not used)
42, insulating blocks
43, brackets mounting electrolyte tank
44, (not used)
45, internal steel tube of lance 2
46, first brass fitting for lance scanning end 47, holes in tube 45
48, second brass fitting on lance scanning end
49, (not used)
50, hose between tank and lance
51, electrolyte valve
52, brass connector
53, wire to connector 52
54, lance insulator cover
55, (not used)
56, dolly chassis protrusions for lance mount to dolly 12
57, clamp on lance 2
58, shaft by which lance 2 is secured to dolly 12
59, (not used)
60, chains or other lines
61, sheaves
62, sprockets
63, rotatable sprocket drive shaft
64, V-belt drive pulley
65, dolly drive motor
66, (not used)
67, (not used)
68, (not used)
69, (not used)
70, electric contact support arm
71a, dolly contact for electrolyte connection into indicator circuit
71b, electric rail for electrolyte connection into indicator circuit
72a and 73a, dolly contacts for solenoid 90 control of electrolyte valve 51
72b and 73b, electric rails for solenoid 90 control of electrolyte valve 51
74, angle irons supporting rails 71b, 72b, 73b
75, limit switch to stop running of tape recorder when dolly at rear position
76, (not used)
77, ground
78, power supply line
79, "automatic" on-off switch
80, power line
81, pipe cradle limit switch open when pipe in cradle, closed when pipe not in cradle
82, pipe cradle unloader arm limit switch closed when unloader reset
83, solenoid control for pipe cradle loader valve 27
84, pipe cradle limit switch closed when pipe in cradle
85a, dolly rear limit switch closed only when dolly in rear limit position
85b, dolly rear limit switch open only when dolly at rear limit position
85c, dolly rear limit switch closed only when dolly at rear limit position
86a, time delay control for switch 86b
86b, dolly forward starter switch closed by control 86a
87, terminal
88a, forward relay coil
88b, dolly motor forward power switch
88c, electrolyte solenoid switch closed while motor runs forward
89a, dolly forward limit switch open only when dolly at forward limit position
89b, dolly forward limit switch closes only when dolly at forward limit position
90, solenoid control for electrolyte valve 51
91, dolly motor forward coil
92a, time delay control for switch 92b
92b, dolly motor reverse starter switch closed by control 92a
93a, reverse relay coil
93b, dolly motor reverse power switch
93c, electrolyte solenoid switch closed while motor runs in reverse
94, dolly motor reverse coil
95, (not used)
96a, time delay control for switch 96b
96b, pipe cradle unloader control switch closed except when opened by time delay control
97, solenoid for pipe cradle unloader valve 37
98, stop switch
99, forward push-button switch
100, reverse push-button switch

I claim:
1. Apparatus for inspecting electrically substantially non-conductive coatings on the internal surface of pipe of electrically conductive material comprising
   a pipe support cradle adapted to hold pipe in position for inspection;
   a pipe rack extending on each side of said cradle;
   pipe loading means for moving individual lengths of pipe from one of said racks to said cradle;
   pipe unloading means for moving individual lengths of pipe from said cradle to the other of said racks,
   a support structure including two longitudinally extending way surfaces positioned parallel to the axis of said pipe cradle;
   a carriage mounted on said support structure and having bearing means adapted to run on said way surfaces between a forward position near said cradle and a rear position removed from said cradle;
   a lance carried by said carriage for movement therewith between a rear position wherein said lance is in all its parts out of contact with pipe in said cradle for inspection, to a forward position wherein said lance extends into said pipe;
   a pipe interior contact scanning member mounted upon and carried by said lance;
   power means for moving said carriage, lance and contact scanning member to said forward position whereby said interior contact member is moved into pipe in said cradle and scans the coated surface thereof, and from said forward to said rear position whereby said lance and contact member are again completely withdrawn from said pipe;
   an indicator connected in series with said pipe and said contact scanning member to form a circuit,
   said circuit being adapted to have an electric potential applied thereto whereby current flows therein when said contact scanning member engages a hole in the coating upon the surface of said pipe which current causes said indicator to indicate;
   an electrolyte tank adapted to contain a liquid electrolyte therein which tank is electrically insulated from said carriage;
   said pipe interior contact scanning member being of a porous and wettable character;
   a conduit effecting liquid communication from said tank to said pipe interior contact scanning member whereby electrolyte may flow from said tank to said interior contact scanning member and thereby wet said contact scanning member;
   an electrolyte valve in said conduit effective for turning electrolyte flow off and on;
   automatic control means for reversing said power means when said carriage reaches its forward position;
   automatic control means for opening said electrolyte valve when said carriage leaves its rear position and also for closing said electrolyte valve when said carriage returns to its rear position;
   means for actuating said pipe unloading means in response to the return of said carriage to its rear position;
   means for actuating said pipe loading means in response to the resetting in normal position of said pipe unloading means.
2. Apparatus for inspecting electrically substantially non-conductive coatings on the internal surface of pipe of electrically conductive material comprising
   a pipe support cradle adapted to hold pipe in position for inspection;

a pipe rack extending on each side of said cradle;

pipe loading means for moving individual lengths of pipe from one of said racks to said cradle;

pipe unloading means for moving individual lengths of pipe from said cradle to the other of said racks;

a support structure including two longitudinally extending way surfaces positioned parallel to the axis of said pipe cradle;

a carriage mounted on said support structure and having bearing means adapted to run on said way surfaces between a forward position near said cradle and a rear position removed from said cradle;

a lance carried by said carriage for movement therewith between a rear position wherein said lance is in all its parts out of contact with pipe in said cradle for inspection, to a forward position wherein said lance extends into said pipe;

a pipe interior contact scanning member mounted upon and carried by said lance;

power means for moving said carriage, lance and contact scanning member to said forward position whereby said interior contact member is moved into pipe in said cradle and scans the coated surface thereof, and from said forward to said rear position whereby said lance and contact member are again completely withdrawn from said pipe;

an indicator connected in series with said pipe and said contact scanning member to form a circuit, said circuit being adapted to have an electric potential applied thereto whereby current flows therein when said contact scanning member engages a hole in the coating upon the surface of said pipe which current causes said indicator to indicate;

automatic control means for reversing said power means when said carriage reaches its forward position;

means for actuating said pipe unloading means in response to the return of said carriage to its rear position;

and means for actuating said pipe loading means in response to the resetting in normal position of said pipe unloading means.

3. An apparatus for electrically inspecting a substantially non-conductive internal coating on an electrically conductive pipe comprising:

a pipe support for supporting said pipe during inspection, a lance support frame positioned axially from the end of said pipe support and comprising a cantilevered lance mounted on said lance support frame, an electrolyte reservoir connected to said lance support frame and electrically insulated therefrom, a scanning head mounted upon said lance near the unsupported end thereof and comprising an arcuate member of porous material wetted with an electrolyte and of a size to resiliently contact the internal surface of said pipe, a fluid conduit connecting said reservoir and said arcuate member for controllably supplying electrolyte to said arcuate member, an indicator connected in series with said pipe and said arcuate member to form a circuit having an electrical potential supplied thereto whereby current flows therein when said arcuate member engages a hole in said coating, a powered carriage means attached to said apparatus for effecting relative reciprocal axial movement of said arcuate member through said pipe.

4. An apparatus for electrically inspecting a substantially non-conductive internal coating on an electrically conductive pipe, comprising:

a pipe support cradle for holding said pipe in position for inspection, a lance support frame positioned axially from the end of said pipe support frame and comprising a carriage mounted on said lance support frame for reciprocal axial movement on said lance support frame, a cantilevered lance secured to said carriage for movement therewith and positioned for insertion into and removal from one end of said pipe being inspected and of such length to project into said pipe when said carriage is in its forward position and to be completely withdrawn from said pipe when said carriage is in its rearward position, an electrolyte reservoir mounted on said carriage for movement therewith and electrically insulated therefrom, a scanning head mounted upon said lance near the unsupported end thereof and comprising an arcuate member of porous material wetted with an electrolyte and of a size to resiliently contact the internal surface of said pipe, a fluid conduit connecting said reservoir and said arcuate member for controllably supplying electrolyte to said arcuate member, power means for reciprocally moving said carriage to its forward position and rearward position whereby said arcuate member traverses the internal surface of said pipe during both forward and rearward movement, an indicator connected in series with said pipe and said arcuate member to form a circuit having an electrical potential supplied thereto whereby current flows therein when said arcuate member engages a hole in said coating.

References Cited in the file of this patent

UNITED STATES PATENTS

| | | |
|---|---|---|
| 2,308,159 | Drummond et al. | Jan. 12, 1943 |
| 2,506,478 | Wright | May 2, 1950 |
| 2,572,597 | Connor | Oct. 23, 1951 |
| 2,573,815 | Smith | Nov. 6, 1951 |
| 2,615,077 | Tinker | Oct. 21, 1952 |